Aug. 10, 1926.

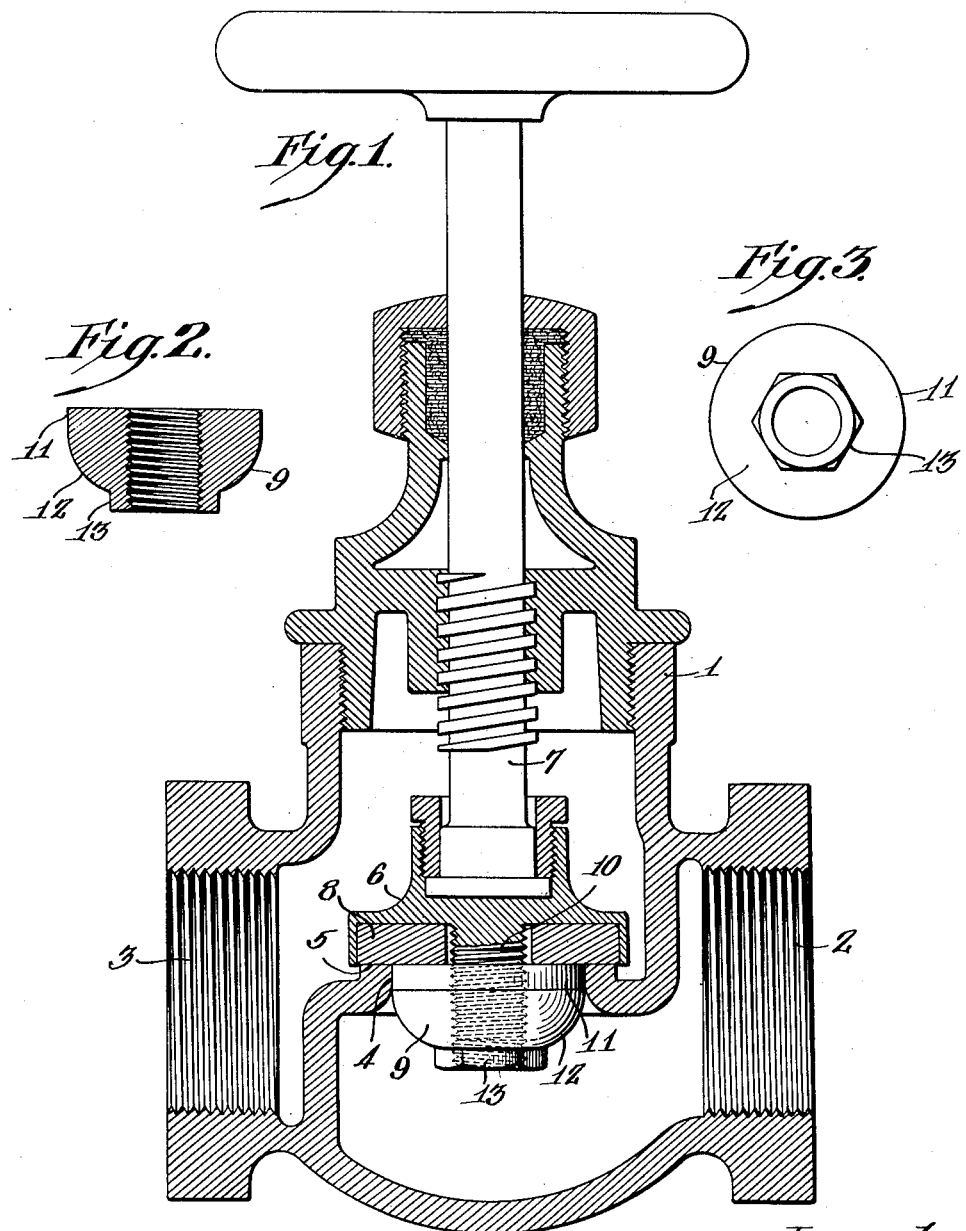

L. S. JOHNSON

GLOBE VALVE

Filed May 28, 1925    2 Sheets-Sheet 2

1,595,786

Witnesses:
Walter Chisny
George A. Gruss

Inventor
Lewis S. Johnson
by Joshua R. H. Potts
his Attorney

Patented Aug. 10, 1926.

1,595,786

UNITED STATES PATENT OFFICE.

LEWIS S. JOHNSON, OF PHILADELPHIA, PENNSYLVANIA.

GLOBE VALVE.

Application filed May 28, 1925. Serial No. 33,333.

My invention relates to globe valves and more particularly to the disk gasket and securing nuts.

The globe valves now in use become leaky due to the gasket and seat being worn by wire drawing of the fluid, that is when the fluid is throttled, the sharp fine streams of the fluid moving swiftly against and between the seat and gasket wear a groove or recess in them and thus make the valve leaky. To maintain a leak-proof condition of the valves they require frequent renewal of the gasket and regrinding of the seat. This is done at the expense of costly delays in production. The waste of steam through leaky valves is also a harmful factor to the efficiency of fuel consumption.

The object of my invention is to provide a member on the disk element of a valve, which will keep the fluid passage practically closed until the disk is raised above the seat a sufficient distance to be out of the zone of wire drawing action and thereby avoid the harmful effects of wire drawing on the gasket and seat.

This object, and other advantageous ends which will be described hereinafter, I attain in the following manner, reference being had to the accompanying drawings in which—

Figure 4:
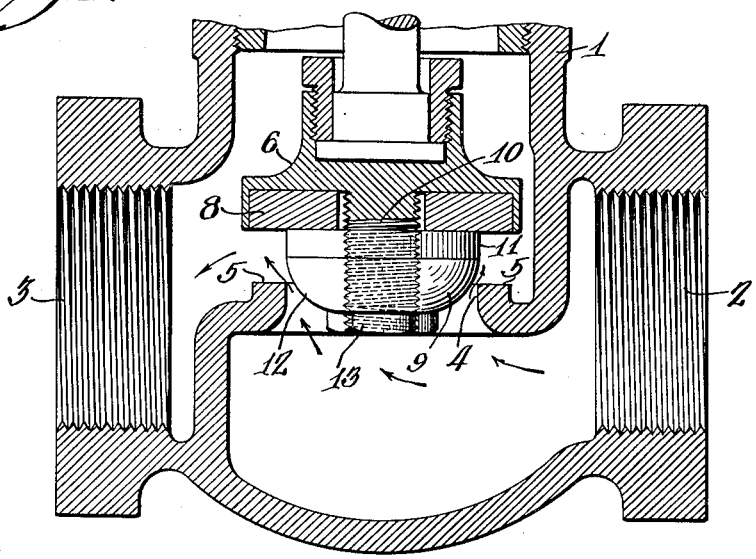
Figure 5:
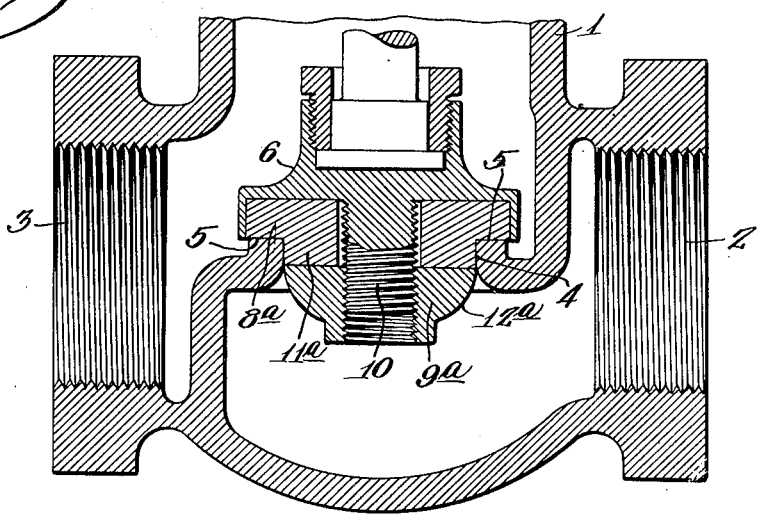

Figure 1 is a central section through a globe valve having my invention applied thereto, Figure 2 is a central section through an element of my invention, Figure 3 a bottom plan view of said element, Figure 4 a view similar to Figure 1 illustrating the valve partly opened, and Figure 5 a fragmentary view similar to Figure 1 illustrating a modified form applied to the valve.

Referring to the drawings, 1 indicates a valve casing having an inlet 2, an outlet 3 and a fluid passage 4 between the inlet and outlet. A seat 5 surrounds the passage. A disk element 6 carried by a stem 7 threaded in the casing, is provided with a sealing gasket 8 adapted to abut the seat. The gasket is secured to the disk element by a nut 9 threaded to a stud 10 depending from the disk element. The nut is provided with a cylindrical face 11 which snugly fits the wall of fluid passage 4, and a downwardly converging face 12 emerging from the cylindrical face. An angular boss 13 on the lowermost part of face 12 is adapted to fit a wrench for turning the nut.

In Figure 5, I have shown a gasket 8$^a$ provided with a depending part 11$^a$ which snugly fits the walls of passage 4. A nut 9$^a$ has a downwardly converging face 12$^a$ similar to the face 12 in Figure 1. In all other respects the valve is similar to that shown in Figure 1 and I have therefore given corresponding parts similar reference characters.

When the valve is opened slightly, such as shown in Figure 4, the gasket 8 will be raised above seat 5 to such height before the cylindrical face 11 leaves fluid passage 4, that the sharp streams of the swiftly escaping fluid will not pass directly against the gasket or cause a wire drawing action between the gasket and the seat. The converging face 12 opens the passage gradually as the disk is raised upwardly to the open position.

From actual use I have found that the harmful effects of wire drawing are entirely avoided and a leak-proof condition of the valve is maintained for long periods.

While I have described my invention as taking a particular form, it will be understood that the various parts may be changed without departing from the spirit thereof, and hence I do not limit myself to the precise construction set forth, but consider that I am a liberty to make such changes and alterations as fairly come within the scope of the appended claim.

Having thus described my invention, what I claim as new and desire to secure by Letters Patent is:—

The combination with a disk element having a gasket and provided with a projection, a valve casing having a fluid passage and a seat surrounding the passage adapted to be abutted by the gasket; and a nut threaded to said projection for securing the gasket to said element and provided with a face having a cylindrical portion snugly fitting the walls of the passage and a portion below said cylindrical portion downwardly and inwardly curved.

In testimony whereof I have signed my name to this specification.

LEWIS S. JOHNSON.